United States Patent [19]
Bridges et al.

[11] Patent Number: 5,383,496
[45] Date of Patent: Jan. 24, 1995

[54] COUPLING WITH OFFSET CLOSURE

[75] Inventors: Donald Y. Bridges, 3014 Creek Ct., Roswell, Ga. 30075; Charles W. Fisher, Lawrenceville, Ga.

[73] Assignee: Donald Y. Bridges, Roswell, Ga.

[21] Appl. No.: 160,956

[22] Filed: Dec. 3, 1993

Related U.S. Application Data

[63] Continuation-in-part of Ser. No. 978,770, Nov. 19, 1992, Pat. No. 5,295,716, which is a continuation-in-part of Ser. No. 861,940, Apr. 2, 1992, Pat. No. 5,286,064.

[51] Int. Cl.$^6$ .............................. F16L 21/02
[52] U.S. Cl. ......................... 138/99; 285/15; 285/373; 285/419; 285/910
[58] Field of Search ............ 285/373, 419, 15, 910; 138/99, 97; 277/9

[56] References Cited

U.S. PATENT DOCUMENTS

| | | | |
|---|---|---|---|
| 234,799 | 11/1880 | Neely | 138/99 |
| 411,130 | 9/1889 | Robinson | 285/419 X |
| 518,805 | 4/1894 | Cooper | 138/99 |
| 1,649,752 | 11/1927 | Stone | 285/373 X |
| 1,790,957 | 2/1931 | Sykes . | |
| 2,849,244 | 8/1958 | Sampson | 285/134 |
| 2,980,141 | 4/1961 | Harris | 285/373 X |
| 3,173,450 | 3/1965 | Halterman | 285/373 X |
| 3,479,066 | 11/1969 | Gittleman | 285/236 |
| 3,700,008 | 10/1972 | Hackman | 285/373 X |
| 3,712,631 | 1/1973 | Forchini et al. | 277/207 |
| 3,821,971 | 7/1974 | Christensen | 138/99 |
| 3,915,197 | 10/1975 | Piccirilli | 138/97 |
| 3,960,395 | 6/1976 | Circule et al. | 285/370 |
| 4,049,298 | 9/1977 | Foti | 285/373 X |
| 4,108,481 | 8/1978 | Graham | 285/231 |
| 4,172,607 | 10/1979 | Norton | 285/236 |
| 4,303,103 | 12/1981 | Marks et al. | 138/97 |
| 4,347,018 | 8/1982 | Wrightson et al. | 405/150 |
| 4,360,227 | 11/1982 | Bridges | 285/373 |
| 4,583,770 | 4/1986 | Kreku et al. | 285/373 X |
| 4,652,023 | 3/1987 | Timmons | 285/93 |
| 4,664,428 | 5/1987 | Bridges | 285/373 |
| 4,927,189 | 5/1990 | Burkit | 285/109 |
| 5,076,618 | 12/1991 | Bridges | 285/370 |
| 5,086,809 | 2/1992 | Bridges | 139/99 |
| 5,137,305 | 8/1992 | Straub | 285/373 X |
| 5,286,064 | 2/1994 | Bridges | 285/15 |
| 5,295,716 | 3/1994 | Bridges | 285/15 |

FOREIGN PATENT DOCUMENTS

| | | |
|---|---|---|
| 227512 | 1/1959 | Australia . |
| 3017632 | 11/1981 | Germany . |
| 763665 | 12/1956 | United Kingdom . |
| 790109 | 2/1958 | United Kingdom . |

OTHER PUBLICATIONS

Brochure of Miller Pipeline Corp. "WEKO-SEAL Internal Joint Sealing System for Water and Wastewater Piping," (Rev. Mar. 1988) (4 pages).

Brochure of AMEX Gesellschaft Für Rohrleitungsbauteile und Anlagentechnik mbH, "AMEX-1-0-Reconstruction and Sealing System for Accessible Pipelines; AMEX 32-400 Foilrelining for Non-accessible Pipelines" (20 pages).

Brochure of Brico Industries, Inc., Depend-O-Lok Mechanical Coupling Systems, Catalog 202 (10 pages) Jun. 1989.

*Primary Examiner*—Randolph A. Reese
*Assistant Examiner*—Heather Chun Shackelford
*Attorney, Agent, or Firm*—Jones & Askew

[57] ABSTRACT

A pipe coupling wherein the axial split is offset from the location wherein the coupling is closed. The offset increases the resistance of the pipe coupling to lifting forces exerted by pressurized fluid in pipes or pipelines. In addition, an extension member and a reinforcing member on the opposite sides of the closure device increase the section modulus of the pipe coupling and further increase the resistance of the pipe coupling to lifting forces.

4 Claims, 7 Drawing Sheets

Fig. 2

Fig_3

Fig_8

COUPLING WITH OFFSET CLOSURE

CROSS REFERENCE TO RELATED APPLICATIONS

This application is a continuation-in-part of U.S. patent application Ser. No. 07/978,770 filed Nov. 19, 1992, entitled "Pipe Coupling With Sealing Plate," now U.S. Pat. No. 5,295,716, which is a continuation-in-part of U.S. patent application Ser. No. 07/861 940 filed Apr. 2, 1992, Now U.S. Pat. No. 5,286,064, entitled "Sealing Plate for Pipe Coupling." Applicant hereby expressly incorporates by reference these co-pending, commonly owned patent applications, Ser. No. 07/978,770 and 07/861,940.

TECHNICAL FIELD

The present invention relates to couplings for sealing leak locations in pipes and pipelines and for joining adjacent pipe ends. More particularly, the present invention relates to pipe couplings having an axial joint that must be sealed.

BACKGROUND OF THE INVENTION

The sealing of pipe joints and other leak locations in pipes and pipelines is a critical concern, and proper sealing has become more important as efforts have increased to protect the environment. Liquid chemicals, sewage, toxic gases, and other fluid-like materials such as fine dust, must be conducted through pipelines without leakage of the material from the pipeline and without contamination from outside the pipeline. To seal pipe joints, pipeline installers typically encircle the joint with a cylindrical coupling consisting of either two semicylindrical pieces fastened together to clamp the pipe ends, or a single cylindrical piece having an axial split which allows the coupling to be open by an amount sufficient to fit over the pipe ends.

Annular gasket members, such as O-rings, may be placed around the pipe ends beneath the coupling to block the escape of fluid between the coupling and pipe ends, but it is also necessary to block escape of fluid outwardly through the axial split of the coupling. Several prior devices for this purpose have been developed, as described in U.S. Pat. Nos. 4,360,227; 1,607,943; 2,913,262; 3,153,550; 4,664,428; and 5,086,809, and U.S. patent application Ser. Nos. 07/978,770 filed Nov. 19, 1992, entitled "Pipe Coupling with Sealing Plate" and 07/861,940 filed Apr. 2, 1991, entitled "Sealing Plate for a Pipe Coupling".

For example, U.S. Pat. No. 4,664,428 discloses a sealing plate for preventing passage of fluid from between the annular gasket members of a pipe coupling to the outer surface of the pipe coupling through the axial split of the pipe coupling. One sealing plate disclosed in this patent fits over the annular gasket members and between the coupling and the pipe ends and spans the axial split. The sealing plate includes axial gaskets on opposing edges for preventing the flow of fluid to the outside of the coupling. The coupling is closed by closing plates or flanges mounted to the pipe coupling on each side of the axial split. The closing plates are fastened by bolts extending through holes in the closure plates. The holes in the closure plates are larger in diameter than the bolts so that the bolts may be inserted into the closure plates while the closure plates are still apart and at an angle to one another.

When a pipe coupling such as that disclosed in U.S. Pat. No. 4,664,428 is mounted to a pipe or pipeline containing pressurized fluid, the pressurized fluid exerts forces on the coupling. The resultant forces act on the coupling to pull the closure plates in opposite directions and away from one another. If the pressure in the pipe or the pipeline exceeds a particular level, the section modulus of the coupling is overcome and the spaces between the bolts and the bolt holes in the closure plates allow the closure plates to rotate which causes a lifting of the body of the coupling up and off of the associated pipe or pipeline. As a result, the pressure of the coupling on the annular gasket members is reduced and the annular gasket members can be extruded through the space between the coupling and the pipe. This can result in a leak. It is not a practical solution to make the bolt holes smaller. If the bolts connecting the closure plates were to fit more tightly in the bolt holes, the insulation of a coupling would be too difficult.

Therefore, there is a need for a pipe coupling of the type having an axial split that can withstand higher pressures without failing.

SUMMARY OF THE INVENTION

The present invention solves the above-described problems by providing a pipe coupling wherein the closure device is offset from the axial split of the coupling. Generally described, the pipe coupling of the present invention comprises a cylindrical member having an axial split defined by first axial edge and a second axial edge. An extension member is attached to the outer surface of the cylindrical member adjacent the first axial edge and extends beyond the first axial edge to a third axial edge spaced from the axial split. The coupling further includes a device for joining the third axial edge of the extension member to the outer surface of a cylindrical member at a closure location spaced from the axial split.

When the coupling is fitted about a leak location in a pipe or pipeline, the coupling is typically fitted over annular gasket members placed around the leak location. A typical leak location is the gap between adjacent pipe ends in a pipeline. When the third axial edge of the extension member of the pipe coupling is joined to the outer surface of a cylindrical member, the pipe coupling is closed, the extension member extends over the axial split and the second axial edge, and the cylindrical member compresses the annular gasket members against the pipe or pipeline to form a fluid impermeable seal. Because the third axial edge of the extension member is attached to the outer surface of the cylindrical member at a closure location spaced from the axial split of the cylindrical member, the device for joining the third axial member of the extension member to the outer surface of the cylindrical member is offset from the axial split. By offsetting the joining or closure device from the axial split, the coupling is more resistant to lifting forces exerted by the pressurized fluid in the pipe or pipeline.

More particularly, the pipe coupling of the present invention further comprises an axial gasket member adjacent the axial split of the cylindrical member for preventing passage of fluid from between the annular gasket members fitted about the leak locations to the outer surface of the cylindrical members through the axial split. A suitable axial gasket member includes a sealing plate positioned between the axial split and the pipe or pipeline when the pipe coupling is closed. The axial gasket member can be a piece separate from the pipe coupling or the gasket member can be attached to the pipe coupling. In one embodiment, the sealing plate is attached to the inner surface of a cylindrical member adjacent the second axial edge and extends outwardly beyond the second axial edge to an axial plate edge. Desirably, a sealing pad is attached to the outer surface of the sealing plate and extends beyond the axial plate edge, such that when the pipe coupling is closed, the sealing plate extends between the axial split and the pipe or pipeline and beyond the axial split so that the axial plate edge is spaced from the axial split, and the sealing pad fits between the inner surface of the cylindrical member and the pipe or pipeline in the region of the annular gasket members. It should be understood, however, that a number of axial gasket members can be used with the present invention.

Desirably, the sealing plate has first and second circumferential edges at opposite ends extending from the axial plate edge toward the second axial edge of the cylindrical member, and first and second stop members attached to the inner surface of the sealing plate proximate the first and second circumferential edges, respectively, for preventing outward movement of the annular gasket members. Thus, when the coupling is applied to a pipe or pipeline containing high pressure fluid, the stop members assist in preventing extrusion of the gasket members between the coupling and the pipe or pipeline.

Still more particularly, the cylindrical member of the pipe coupling of the present invention defines a pair of annular arcuate grooves extending outwardly from the inner surface thereof for receiving the annular gasket members. Likewise, the axial gasket member is shaped to follow the contour of the arcuate grooves.

A suitable device for joining the third axial edge of the extension member to the outer surface of the cylindrical member includes a first closure plate extending outwardly from the extension member at the third axial edge, a second closure plate extending outwardly from the outer surface of the cylindrical member at the closure location spaced from the axial split, and a device for holding the first and second closure plates adjacent to one another.

Desirably, the pipe coupling of the present invention further comprises a reinforcing member attached to the outer surface of the cylindrical member and extending from the second closure plate away from the second axial edge. This reinforcing member and the extension member increase the thickness of the pipe coupling proximate the axial split and the joining or closure device and thereby increase the section modulus of the pipe coupling. This further reduces the tendency of the coupling to lift from the pipe ends in high pressure applications.

Desirably, the closure location where the extension member is joined to the outer surface of the cylindrical member is spaced from the axial split at least 30° from the axial split when the pipe coupling is closed. More desirably, the closure location where the extension member is joined to the outer surface of the cylindrical member is spaced from about 30° to 60° from the axial split when the pipe coupling is closed. This degree of offset provides enhanced resistance to lifting forces without the addition of excessive structural mass to the coupling.

Accordingly, an object of the present invention is to provide an improved pipe coupling.

Another object of the present invention is to provide an improved pipe coupling of the type having an axial split.

A further object of the present invention is to provide a pipe coupling for high pressure application.

Still another object of the present invention is to provide a pipe coupling which is less likely to leak.

Other objects, features, and advantages of the present invention will become apparent upon review of the following detailed description of embodiments of the invention, when taken in conjunction with the accompanying drawings and appended claims.

DETAILED DESCRIPTION OF DRAWINGS

Figure 1:
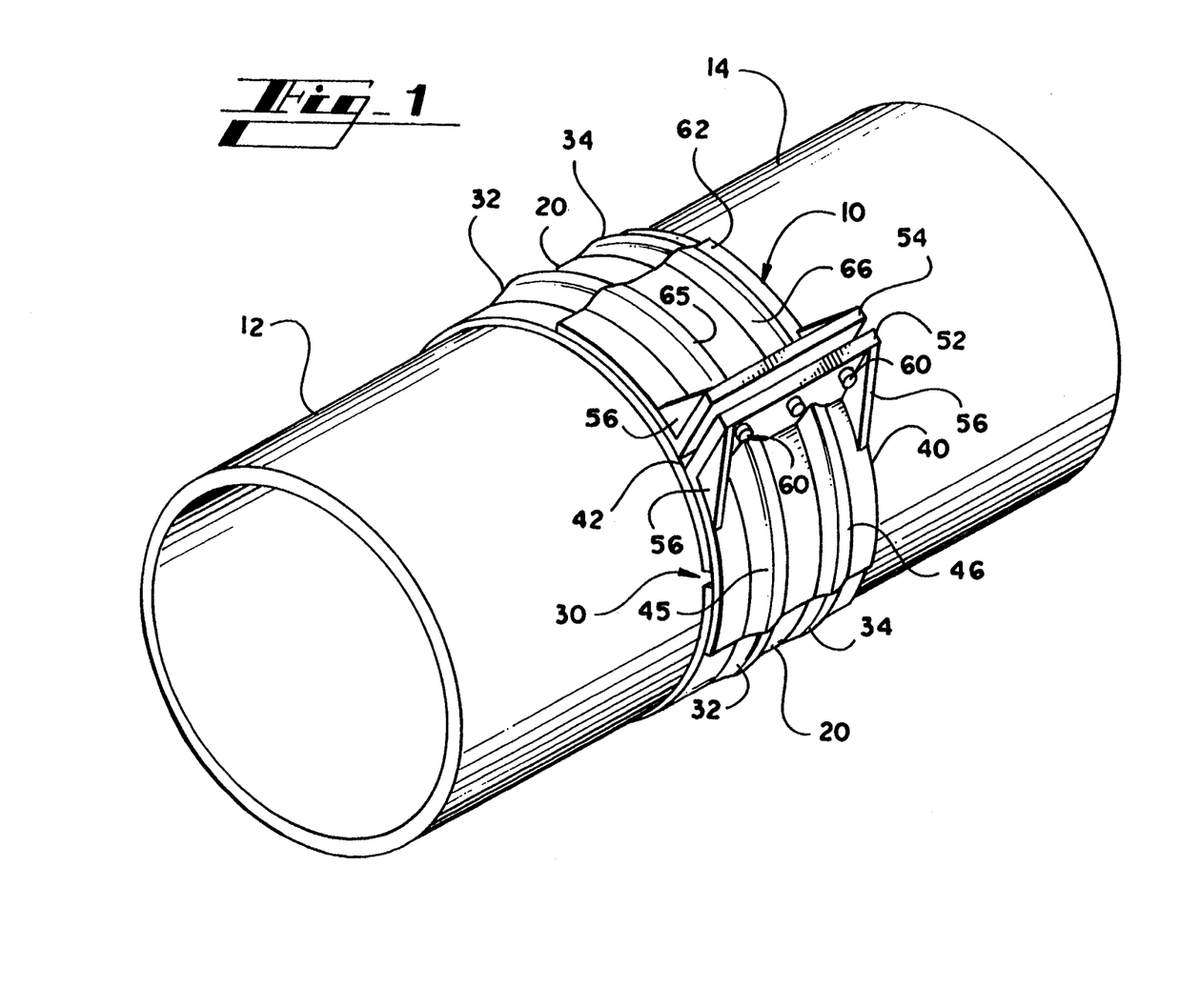
FIG. 1 is a perspective view of an embodiment of a pipe coupling of the present invention mounted about two pipe ends. The coupling shown in this figure is in the closed position.
Figure 2:
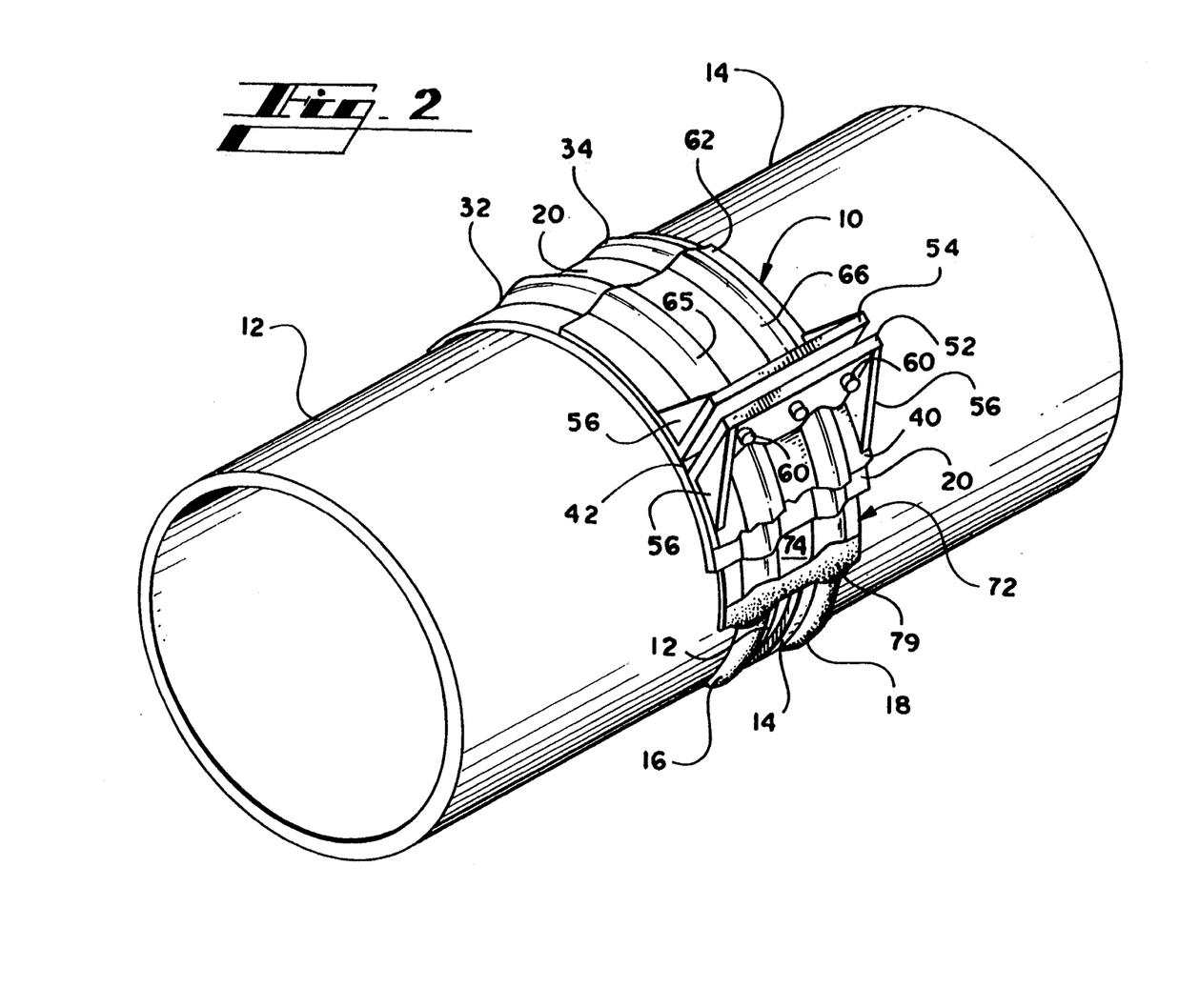
FIG. 2 is a partial perspective view of the pipe coupling shown in FIG. 1 with portions of the pipe coupling broken away to reveal interior parts.

Referring now in more detail to the drawings, in which like numerals refer to like parts throughout the several views, FIG. 1 shows a pipe coupling 10 according to an embodiment of the present invention. The pipe coupling 10 is shown in place and closed about adjacent pipe ends 12 and 14. FIG. 2 shows the same pipe coupling 10 except that portions of the pipe coupling have been broken away to expose interior parts. As can be seen, the pipe coupling 10 fits over a pair of annular gasket members 16 and 18 which are O-rings that fit about the respective pipe ends 12 and 14.

Figure 3:
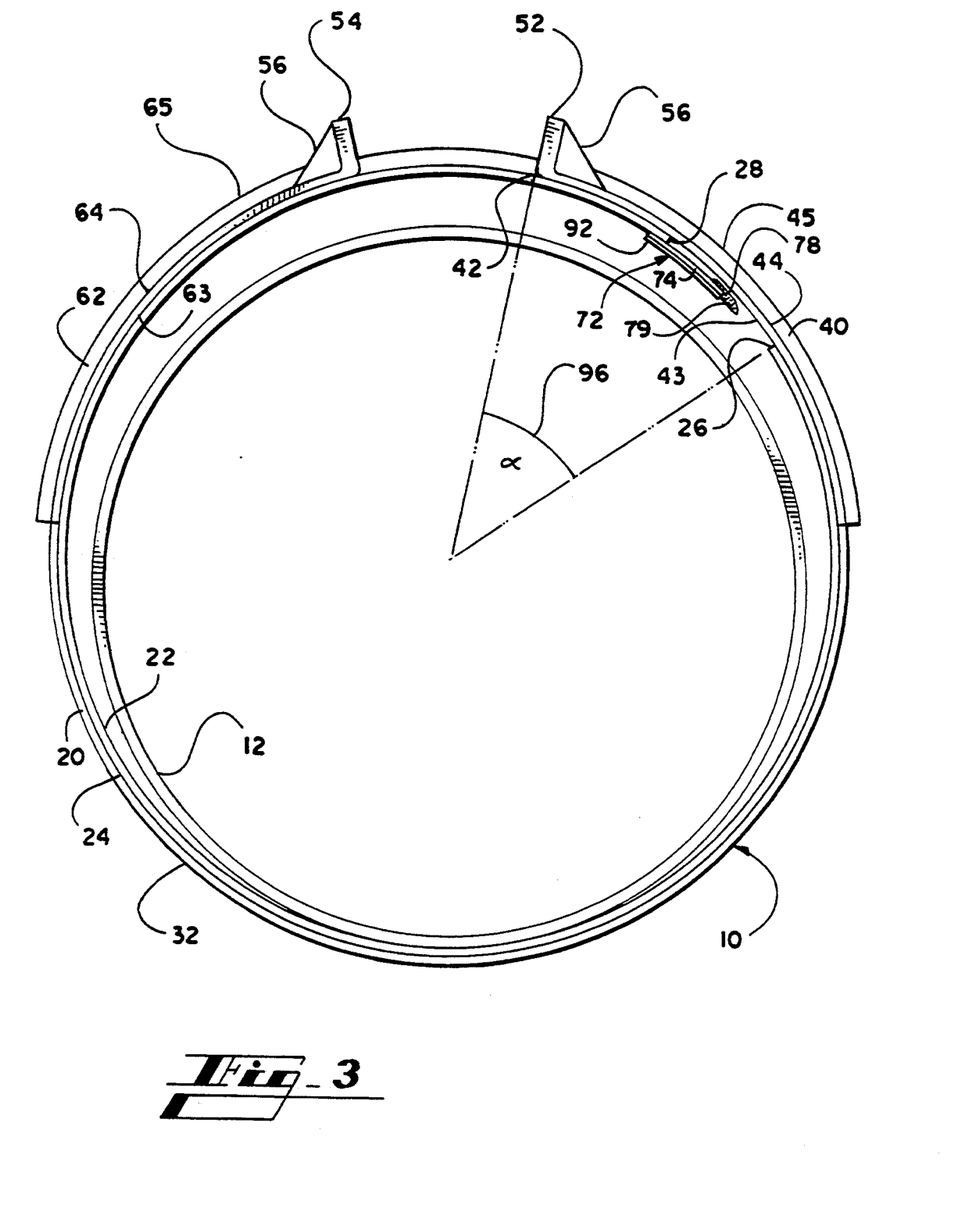
FIG. 3 is a side elevation view of the pipe coupling shown in FIG. 1 with the pipe coupling in the open position about the pipe ends.

The pipe coupling 10 includes a cylindrical member 20 having an inner surface 22 and an outer surface 24. As shown more clearly in FIGS. 3 and 4, the cylindrical member extends from a first axial edge 26 to a second axial edge 28. The first and second axial edges 26 and 28 form an axial split 30 in the cylindrical member. As used herein, the term "axial" means a dimension generally parallel to longitudinal axis of the pipe or pipe ends.

Figure 5:
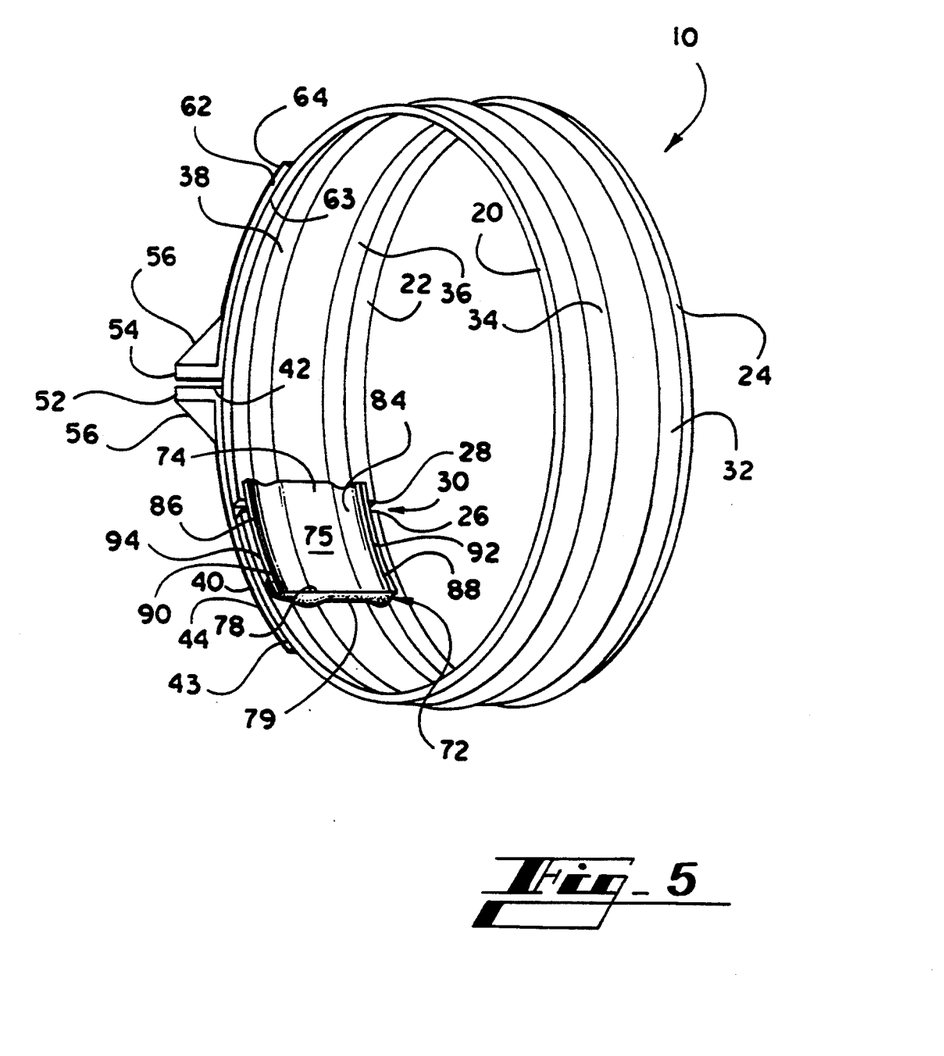
FIG. 5 is a perspective view of the pipe coupling of FIG. 1 apart from the pipe ends and shows the inner surface of the sealing plate. In this figure, the pipe coupling is in the closed position.
Figure 6:
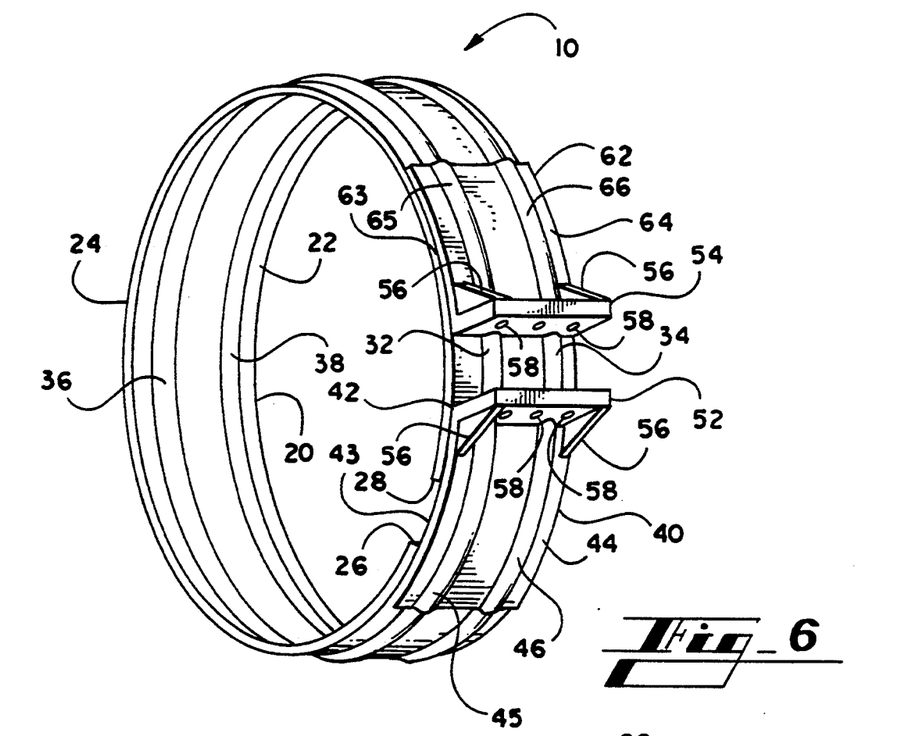
FIG. 6 is a perspective view of the pipe coupling shown in FIG. 1 apart from the pipe ends. This figure shows the coupling in the open position and illustrates the structure of the joining or closure device.

As can best be seen in FIGS. 5 and 6, the cylindrical member 20 of the pipe coupling 10 includes a pair of annular protrusions 32 and 34 extending the entire outer surface 24 of the cylindrical member from the first axial edge 26 to the second axial edge 28. Corresponding annular grooves 36 and 38 extend from the first axial edge 26 to the second axial edge of the cylindrical member 20 along the inner surface 22 of the cylindrical member. The annular grooves 36 and 38 receive the annular gasket members 16 and 18 when the pipe coupling 10 is fitted about the pipe ends 12 and 14. This is best shown in FIG. 2.

Figure 4:
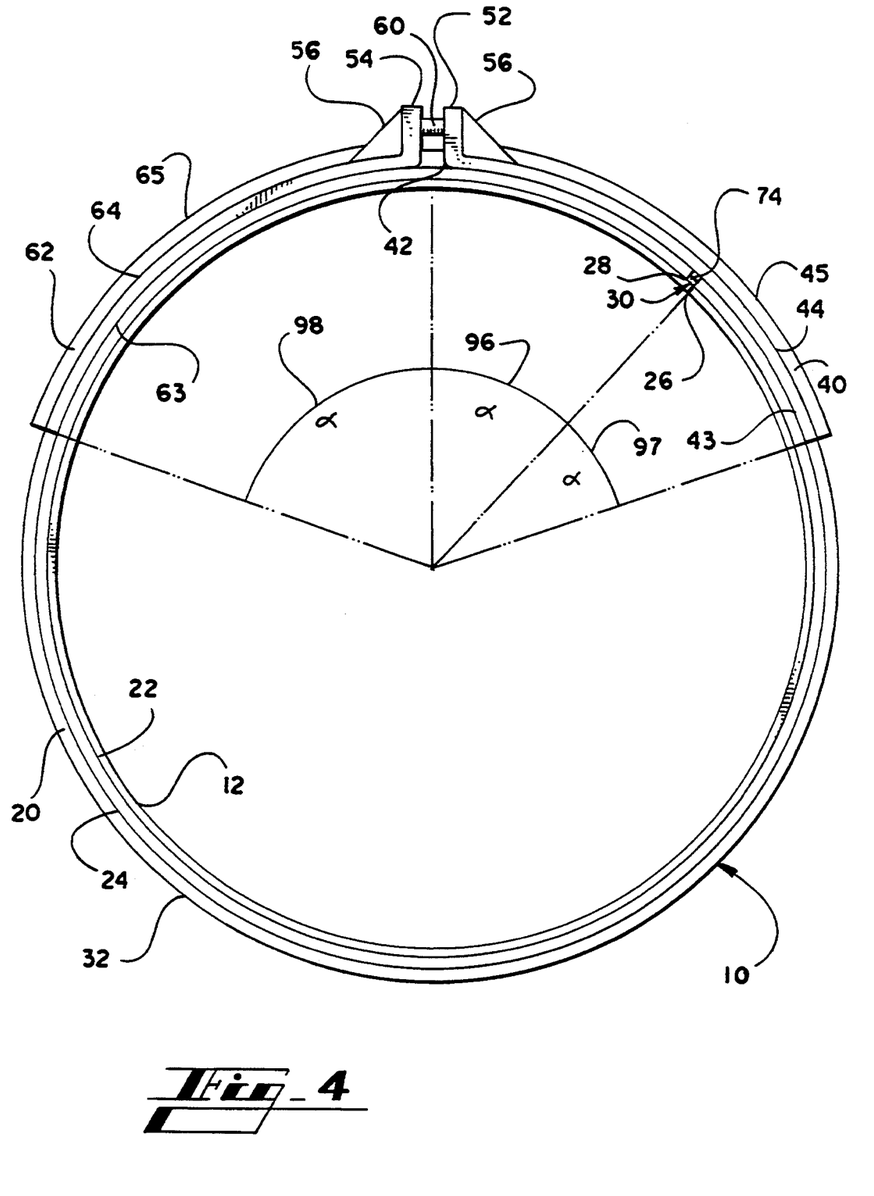
FIG. 4 is a side elevation view of the pipe coupling shown in FIG. 1 with the pipe coupling in the closed position about the pipe ends.

The pipe coupling 10 also includes an extension member 40 attached to the outer surface 24 of the cylindrical member 20 adjacent the first axial edge 26. The extension member 40 extends beyond the first axial edge outwardly from the cylindrical member 20 to a third axial edge 42. The extension member 40 has a cross-section that corresponds to the cross-section of the cylindrical member 20. The extension member 40 includes an inner surface 43 and an outer surface 44 and annular protrusions 45 and 46 extending the length of the extension member. Likewise, annular grooves extend along the inner surface 43 of the extension member 40 and correspond to the annular protrusions 45 and 46. A portion of the inner surface 43 of the extension member 40 is attached to the outer surface 24 of the cylindrical member 20 by means such as welding, and the annular grooves of the extension member 40 receive the annular protrusions 32 and 34 extending from the outer surface of the cylindrical member. As shown in FIG. 4, when the pipe coupling 10 is closed, the extension member 40 extends over the axial split 30 of the cylindrical member 20 and the second axial edge 28 and the portion of the extension member extending beyond the first axial edge receives the outer surface 24 of the cylindrical member adjacent the second axial edge. Again, the annular grooves of the extension member 40 receive the annular protrusions 32 and 34 of the cylindrical member 20.

A first closure plate or flange 52 extends outwardly from the extension member 40 at the third axial edge 42. A corresponding second closure plate or flange 54 extends outwardly from the outer surface 24 of the cylindrical member 20 at a closure location spaced from the axial split 30 of the cylindrical member. The first and second closure plates 52 and 54 are mounted to the pipe coupling 10 by means such as welding. Triangular braces 56 are mounted at the ends of the first and second closure plates 52 and 54 for additional structural support. Each of the first and second closure plates 52 and 54 have three holes 58 for receiving bolts 60 which are used to join the first and second closure plates 52 and 54 together, thereby joining the third axial edge 42 of the extension member 40 to the outer surface 24 of the cylindrical member 20 at the closure location spaced from the axial split 30 of the cylindrical member. The holes 58 in the first and second closure plates 52 and 54 are aligned with one another and are larger than the diameter of the bolts 60 by about an eighth of an inch so that the bolts can be inserted through the holes while the pipe coupling 10 is still open and the first and second closure plates are spaced from and at an angle to one another.

Clamps or any other appropriate means for joining the third axial edge 42 of the extension member 40 to the outer surface 24 of the cylindrical member 20 at the location spaced from the axial split 30 can be used. In addition, clamps or the like can be used instead of bolts to hold the first and second closure plates 52 and 54 together.

The pipe coupling 10 further includes a reinforcing member 62 attached to the outer surface 24 of the cylindrical member 20 and extending from the second closure plate 54 away from the second axial edge 28. The reinforcing member 62 is attached to the outer surface 24 of a cylindrical member 20 by means such as welding. The second closure plate 54 is attached to the reinforcing member 62. The reinforcing member 62 has the same structure as the extension member 40. The reinforcing member 62 has an inner surface 63 and an outer surface 64. Annular protrusions 65 and 66 extend along the outer surface 64 of the reinforcing member 62 and corresponding annular grooves extend along the inner surface 63. The annular grooves of the reinforcing member 62 receive the annular protrusions 32 and 34 of the outer surface 24 of the cylindrical member 20.

Figure 7:
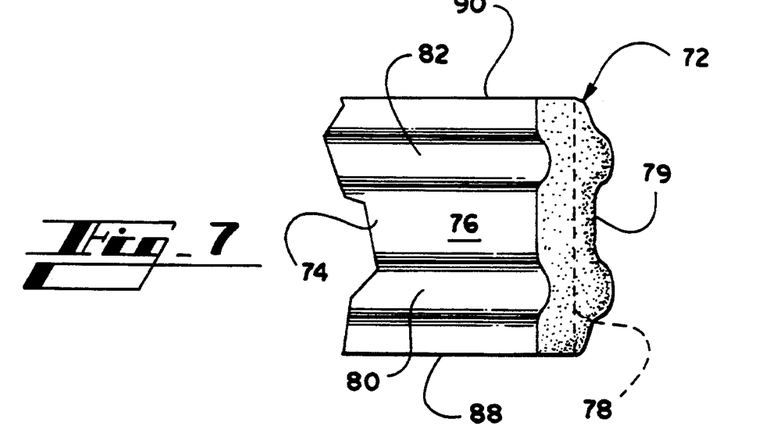
FIG. 7 is a partial plan view of the axial gasket member shown in FIG. 5.
Figure 8:
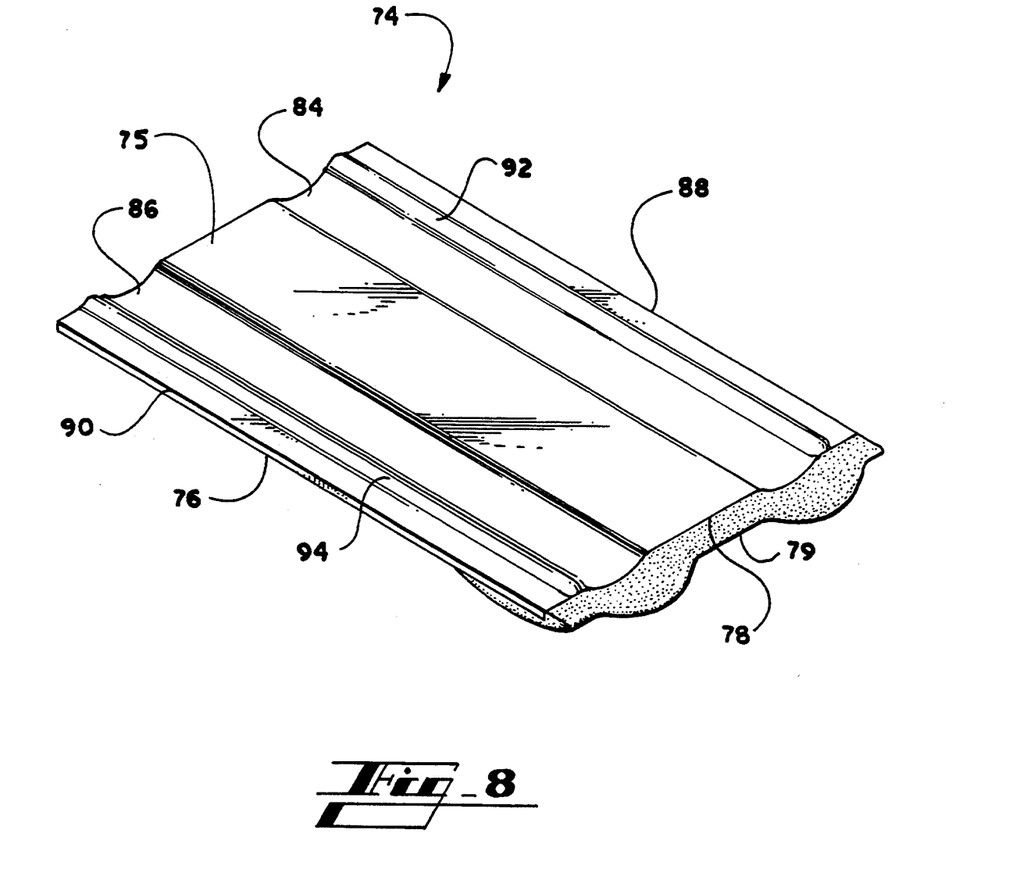
FIG. 8 is a perspective view of the axial gasket member shown in FIG. 5.

The pipe coupling 10 further includes an axial gasket member 72 which is positioned adjacent the axial split 30 of the cylindrical member 20 when the pipe coupling 10 is closed and prevents the passage of fluid from between the annular gasket members 16 and 18 to the outer surface 24 of the cylindrical member through the axial split. As best seen in FIGS. 5, 7, and 8 the axial gasket member 72 includes a sealing plate 74 having an inner surface 75 and an outer surface 76. The outer surface 76 of the sealing plate 74 is attached to the inner surface 24 of the cylindrical member 20 adjacent the second axial edge 28. The sealing plate 74 extends outwardly beyond the second axial edge 28 to an axial plate edge 78. The axial gasket member 72 further includes a sealing pad 79 attached to the outer surface 76 of the sealing plate 74 adjacent the axial plate edge and extending beyond the axial plate edge. Like the extension member 40 and the reinforcing member 62, the sealing plate 74 has a pair of annular protrusions 80 and 82 extending along the outer surface 76 thereof and corresponding annular grooves 84 and 86 extending along the inner surface 75. Thus, when the pipe coupling 10 is closed, the sealing plate 74 extends between the axial split 30 and the pipe ends 12 and 14 and beyond the axial split so that the axial plate edge 78 is spaced from the axial split, and the sealing pad 79 fits between the inner surface 22 of the cylindrical member 20 and the pipe ends in the region of the annular gasket members 16 and 18.

The sealing plate 74 also has circumferential edges 88 and 90 extending from the axial plate edge 78 toward the second axial edge 28 of the cylindrical member 20. The term "circumferential" used herein means a dimension generally following the curvature of a pipe or pipe ends being joined. As best shown in FIG. 8, a pair of stop members 92 and 94 are attached to the inner surface 75 of the sealing plate proximate the first and second circumferential edges 88 and 90 and extend along those circumferential edges. When the pipe coupling 10 is closed, the stop members 92 and 94 fit between the inner surface 75 of the sealing plate 74 and the pipe ends 12 and 14 and are positioned outside of the annular gasket members 16 and 18. Thus, the first and second stop members 92 and 94 prevent outward movement of the annular gasket members 16 and 18 which can be induced when the pipe coupling is used in high pressure applications.

A particularly advantageous feature of the pipe coupling 10 is that the closure location, where the third axial edge 42 of the extension member 40 is joined to the outer surface 24 of the cylindrical member 20, is offset from the axial split 30 between the first axial edge 26 and second axial edge 28 of the cylindrical member 20. In other words, the closure means of the pipe coupling 10 is offset from the axial split 30 of the pipe coupling. This offset increases the resistance of the pipe coupling 10 to lifting forces exerted by pressurized fluid in the pipes about which the pipe coupling is mounted. Desirably, the offset angle 96 between the axial split 30 and the closure location where the third axial edge 42 is joined to the outer surface 24 is at least 30°. More desirably, the offset angle is from about 30° to about 60°. Within this range of offset angles, the resistance of the pipe coupling to lifting forces is increased substantially without the addition of excessive structural support to the pipe coupling.

The portion of the extension member 40 extending from the first axial edge 26 to the third axial edge 42, has a length that extends around the circumference of the pipe coupling 10 the same number of angular degrees as is the offset angle 96. In other words, the portion of the extension member 40 extending from the first axial edge 26 to the third axial edge 42 has a length that extends from about 30° to about 60° about the circumference of the pipe coupling when closed. Meanwhile, the remaining portion of the extension member 40, which extends away from the first axial edge 26 and is attached to the outer surface 24 of the cylindrical member 20, has a length that extends from about 15° to about 60° about the circumference of the pipe coupling when closed. This angle is shown at 97 in FIG. 4.

The reinforcing member 62 has a length that is desirably substantially equal to the length of the extension member 40 welded to the cylindrical member 20 and extending away from the first axial edge 26. This means that the reinforcing member 62 desirably has a length that extends from about 15° to about 60° around the circumference of the pipe coupling when closed. This angle is shown at 98 in FIG. 4.

The pipe coupling 10 is shown with an axial gasket member 72 fixed to the cylindrical member 20 of the pipe coupling. However, it should be understood that alternative axial gasket members can be used such as an axial gasket member that is separate from the pipe coupling. Suitable axial gasket members are disclosed in U.S. Pat. Nos. 4,360,227; 1,607,943; 2,913,262; 3,153,550; 4,664,428; and 5,086,809 and U.S. patent application Ser. Nos. 07/978,770 filed Nov. 19, 1992, entitled "Pipe Coupling With Sealing Plate" and 07/861,904 filed Apr. 2, 1992, entitled "Sealing Plate For a Pipe Coupling", the disclosures of each of said patents and applications hereby expressly incorporated herein by reference in their entirety.

The composition of the sealing pad 79 may vary depending upon the substance to be carried by the pipe line and the composition of the pipe itself. A gasket material preferred for high pressure, heavy duty pipe lines is molded rubber preferably having a durometer hardness from about 40 to about 80.

The construction of the components of the pipe coupling 10 other than the sealing pad 79 can vary as is understood by those skilled in the art. The material for such components must not be subject to significant corrosion by the substance within the pipeline, and some pipelines must be resistant to deterioration caused by the external environment, such as water, a corrosive atmosphere, the weather, or other particular environment. Carbon and stainless steel are preferred for most applications. The preferred thickness of the components varies with the diameter of the coupling and the pressure within the pipeline.

Installation of the pipe coupling 10 will be apparent from the foregoing description. The annular gasket members or O-rings 16 and 18 are fitted about their respective pipe ends 12 and 14. This can be done before or after the pipe ends are brought into proximity. Either before or after positioning of the annular gasket members 16 and 18, the pipe coupling 10 can be slipped over one of the pipe ends 12 and 14, the pipe ends brought together, and the coupling positioned over the adjacent pipe ends. The annular grooves 36 and 38 of the cylindrical member 20 and the annular grooves 84 and 86 of the sealing plate 74 are positioned over the annular gasket members 16 and 18. The first and second closure plates 52 and 54 are then brought together to compress the annular gasket members 16 and 18 and the axial gasket member 72. Fluid within the pipeline passing outwardly from the pipe ends 12 and 14 cannot pass axially beyond the annular gasket members 16 and 18, and cannot pass the sealing pad 79 of the axial gasket member 72 to reach the axial split 30 of the coupling 10 which is above the sealing plate 74. In addition to the offset between the axial split 30 and the closure location where the third axial edge 42 of the extension member is joined to the outer surface 24 of the cylindrical member 20, the extension member 40 and the reinforcing member 62 increase the section modulus of the pipe coupling 10 and further increase the resistance of the pipe coupling to lifting forces created by the pressurized fluid in the pipeline.

Those skilled in the art will understand that the coupling of the present invention is not limited to an embodiment having a single axial split and a single closure means. Instead, the coupling can be made with two semi-cylindrical halves so that there would be two axial splits and two sets of closure plates. The details of such a pipeline will be understood by those skilled in the art in view of the above-described embodiment.

The foregoing description only relates to embodiments of the present invention, and numerous changes and modifications may be made therein without departing from the spirit and scope of the invention as defined in the following claims.

What is claimed:

1. A pipe coupling for sealing a leak location in a pipe or pipeline by compressing annular gasket members against the pipe or pipeline around the leak location, the pipe coupling comprising:

a cylindrical member having an inner surface, an outer surface, and an axial split defined by a first axial edge and a second axial edge;

an extension member attached to the outer surface of the cylindrical member adjacent the first axial edge and extending beyond the first axial edge to a third axial edge spaced from the axial split;

means for joining said third axial edge to the outer surface of the cylindrical member at a closure location spaced from the axial split such that the extension member extends over the axial split and the second axial edge and the cylindrical member compresses the annular gasket members against the pipe or pipeline; and an axial gasket member adjacent the axial split for preventing passage of fluid from between the annular gasket members to the outer surface of the cylindrical member through the axial split, the axial gasket member comprising a sealing plate positioned between the axial split and the pipe or pipeline when the pipe coupling is closed, wherein the sealing plate has an inner surface, an outer surface, first and second circumferential edges at opposite ends, and first and second stop members attached to the inner surface of the sealing plate proximate the first and second circumferential edges, respectively, for preventing outward movement of the annular gasket members.

2. A pipe coupling for sealing a leak location in a pipe or pipeline by compressing annular gasket members against the pipe or pipeline around the leak location, the pipe coupling comprising:

a cylindrical member having an inner surface, an outer surface, and an axial split defined by a first axial edge and a second axial edge;

an extension member attached to the outer surface of the cylindrical member adjacent the first axial edge and extending beyond the first axial edge to a third axial edge spaced from the axial split;

means for joining said third axial edge to the outer surface of the cylindrical member at a closure location spaced from the axial split such that the extension member extends over the axial split and the second axial edge and the cylindrical member compresses the annular gasket members against the pipe or pipeline; and an axial gasket member adjacent the axial split for preventing passage of fluid from between the annular gasket members to the outer surface of the cylindrical member through the axial split, the axial gasket member comprising:

a sealing plate having an inner surface and an outer surface, the sealing plate attached to the inner surface of the cylindrical member adjacent the second axial edge and extending outwardly beyond the second axial edge to an axial plate edge; and a sealing pad attached to the outer surface of the sealing plate and extending beyond the axial plate edge, such that when the pipe coupling is closed, the sealing plate extends between the axial split and the pipe or pipeline and beyond the axial split so that the axial plate edge is spaced from the axial split, and the sealing pad fits between the inner surface of the cylindrical member and the pipe or pipeline in the region of the annular gasket members.

3. A pipe coupling as in claim 2 wherein the sealing plate has first and second circumferential edges at opposite ends extending from the axial plate edge toward the second axial edge of the cylindrical member, and first and second stop members attached to the inner surface of the sealing plate proximate the first and second circumferential edges, respectively, for preventing outward movement of the annular gasket members.

4. A pipe coupling for sealing a leak location in a pipe or pipeline by compressing annular gasket members against the pipe or pipeline around the leak location, the pipe coupling comprising:

a cylindrical member having an inner surface, an outer surface, and an axial split defined by a first axial edge and a second axial edge;

means for joining said first and second axial edges such that the cylindrical member compresses the annular gasket members against the pipe or pipeline; and an axial gasket member adjacent the axial split for preventing passage of fluid from between the annular gasket members to the outer surface of the cylindrical member through the axial split, the axial gasket member comprising a sealing plate positioned between the axial split and the pipe or pipeline when the pipe coupling is closed, wherein the sealing plate has an inner surface, an outer surface, first and second circumferential edges at opposite ends, and first and second stop members attached to the inner surface of the sealing plate proximate the first and second circumferential edges, respectively, for preventing outward movement of the annular gasket members.

* * * * *